United States Patent [19]

Isakson et al.

[11] Patent Number: 4,521,132
[45] Date of Patent: Jun. 4, 1985

[54] APPARATUS AND METHOD FOR SIMULTANEOUSLY TENSIONING PIPES

[75] Inventors: John E. Isakson, Island County; H. Eugene Nutting, Snohomish County, both of Wash.

[73] Assignee: Western Gear Machinery Co., Everett, Wash.

[21] Appl. No.: 494,811

[22] Filed: May 16, 1983

[51] Int. Cl.³ .................. B63B 35/04; B65H 17/34
[52] U.S. Cl. .................. 405/166; 226/25; 226/35; 226/108; 226/188; 226/195; 405/165
[58] Field of Search ............... 405/165, 166, 167, 179, 405/154; 226/25, 35, 42, 108, 109, 195, 188; 254/134 SCL

[56] References Cited

U.S. PATENT DOCUMENTS

| | | | |
|---|---|---|---|
| 3,392,896 | 7/1968 | Ullman | 226/109 X |
| 3,473,715 | 10/1969 | Shuey | 226/108 |
| 3,658,222 | 4/1972 | Dressel et al. | 226/188 X |
| 3,669,329 | 6/1972 | Blanchet et al. | 226/195 X |
| 3,722,769 | 3/1973 | Aplet et al. | 226/195 X |
| 3,739,971 | 6/1973 | Silvestri et al. | 226/195 X |

FOREIGN PATENT DOCUMENTS 2232232 1/1973 Fed. Rep. of Germany ...... 405/166

*Primary Examiner*—Dennis L. Taylor
*Attorney, Agent, or Firm*—Seed and Berry

[57] ABSTRACT

A method and apparatus for allowing the simultaneous laying of at least two pipes from a pipe-laying barge using at least two coaxially aligned pipe tensioners, wherein a first pipe tensioner tensions a first pipe and allows a second pipe to pass freely through the tensioner, while a second pipe tensioner tensions the second pipe and allows the first pipe to pass freely through it. The apparatus preferably uses modified conventional equipment so that the barge will be able to lay large pipe with the conventional "stovepipe" laying operation.

20 Claims, 6 Drawing Figures

APPARATUS AND METHOD FOR SIMULTANEOUSLY TENSIONING PIPES

DESCRIPTION

1. Technical Field

The present invention relates to an apparatus and method for simultaneously tensioning at least two pipes on a pipe-laying barge. More particularly, the invention relates to an apparatus and method for simultaneously laying at least two pipes by modifying the existing pipe tensioners upon conventional pipe-laying barges.

2. Background Art

A conventional pipe tensioner, as shown in U.S. Pat. No. 3,669,329 (incorporated by reference into this description), maintains constant tension upon a pipe to provide a catenary of sufficiently large radius to prevent undue pipe stress during pipe-laying. The pipe tensioner maintains an optimum, constant catenary while pipe sections are added, and while the vessel rolls and yaws.

As shown in FIG. 1, two or more pipe tensioners 10 are commonly used to maintain the desired catenary. Pipe tensioners 10 of the type described in U.S. Pat. No. 3,669,329 tension the pipe by holding the pipe 12 between opposed caterpillar-type tracks. The caterpillar-type tracks include bridging V-members 14 having rubber pads on bracket legs, as generally in FIG. 6 of the patent.

Alternative pipe tensioners are known, as shown, for example, in U.S. Pat. No. 3,739,971. The method and apparatus of the present invention is not limited to the structure shown in the drawings but could be accomplished with other pipe tensioners, such as those of U.S. Pat. No. 3,739,971.

In U.S. Pat. Nos. 4,230,421 and 4,269,540 reel-type mechanisms for laying pipe from barges are disclosed. At column 20, line 30 and following, of U.S. Pat. No. 4,230,421, the operation of laying bundles of pipe is discussed. These methods do not use two coaxially aligned pipe tensioners to tension a single pipe of the bundle in each respective tensioner.

U.S. Pat. No. 3,722,769 discloses a tensioner control system particularly adapted for use in a pipe tensioner of the type taught and described in U.S. Pat. No. 3,669,329. This system is modifiable for use with the apparatus and method of the present invention.

While the simultaneous laying of two or more pipes is infrequent, the method of the present invention greatly simplifies the operation. The prior art suggests use of reel-type laying barges rather than "stovepipe" laying barges to lay bundles of pipe simultaneously, but these barges are impractical, because it is difficult to achieve and maintain the desired tension with these vessels. Presently, to lay two pipes simultaneously, it is necessary to modify the deck structure to misalign pipe tensioners on the deck. Because the pipe tensioners are expensive and their moving is awkward and burdensome, it is desirable to develop a method where two pipes can be laid simultaneously without significant modification of the positioning of the pipe tensioners. The convertability of the pipe tensioners of the present invention from operation in a conventional pipe-laying operation to a multiple pipe operation is achieved through the improvements discovered in this invention.

DISCLOSURE OF INVENTION

The present invention relates to a method for simultaneously tensioning at least two pipes on a pipe-laying barge, which is simultaneously laying the pipes. The method includes the steps of tensioning a first pipe with a first pipe tensioner while passing a second pipe through the first pipe tensioner untensioned. The second pipe is tensioned with a second pipe tensioner, while the first pipe passes through the second pipe tensioner untensioned. Thus, two pipe tensioners are coaxially aligned to accommodate two pipes and to tension each pipe separately. Of course, multiple pipes can be tensioned if additional pipe tensioners are coaxially aligned on the barge.

The apparatus of the present invention includes two pipe tensioners substantially coaxially aligned. Pipe holders on each pipe tensioner cradle one pipe so that the pipe can be tensioned. Each pipe tensioner allows at least one other pipe to pass freely through the pipe tensioner. In this manner, the barge is capable of laying at least two pipes simultaneously, wherein one pipe is tensioned in a first pipe tensioner and the second is tensioned in a second pipe tensioner. In a preferred embodiment, each pipe tensioner includes a pair of vertically stacked, caterpillar type tracks. Each track includes a conventional motor capable of driving the track independently at a variable speed to maintain a predetermined tension upon the pipe which is tensioned in that pipe tensioner. The caterpillar-type tracks are mounted to a housing which, in turn, is mounted to the barge deck in the manner of U.S. Pat. No. 3,669,329. The tracks are adjustable in the vertical direction within the housing so that the tensioners can receive pipes of different diameters. Each tensioner includes a suspension so that the housing is capable of movement along the direction in which the pipes are fed from the apparatus. As the pipe tensioner housing moves relative to the deck, the movement is sensed and the rate of feed of the pipes from the apparatus is adjusted by adjusting the speed at and direction in which the tracks move. The suspension is also adapted to allow the housing to return to a neutral position so that a substantially constant tension may be maintained on the pipe within the tensioner. Pipe holders are mounted on the tracks to cradle the tensioned pipe. The holders are adapted to allow at least one other pipe to pass freely through the pipe tensioner adjacent to the tensioned pipe.

BEST MODE FOR CARRYING OUT THE INVENTION

Figure 1:
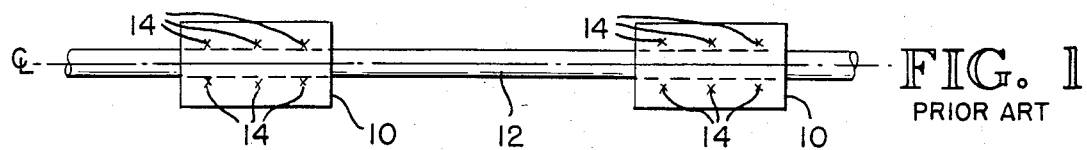
FIG. 1 is a schematic representation of a prior art method and apparatus for tensioning a single pipe.
Figure 2:
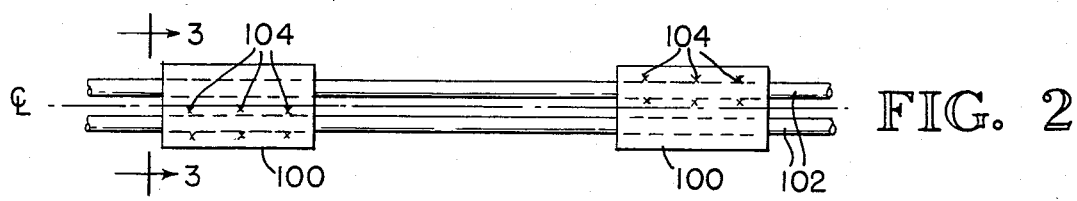
FIG. 2 is a schematic representation of the method and apparatus of the present invention.

As shown in FIG. 2, two coaxially aligned pipe tensioners 100 may be used to independently tension separate pipes 102 while alternatively allowing the pipe-laying barge to also lay a large single pipe which would be tensioned by both pipe tensioners 100 in the conventional prior art method. (See FIG. 1.) Each pipe tensioner 100 includes a plurality of bridging V-members 104 which are interconnected to form an endless belt and which are used to apply the desired tension to each pipe 102. The features of each pipe tensioner 100 will be discussed in further detail later in this description.

Figure 3:
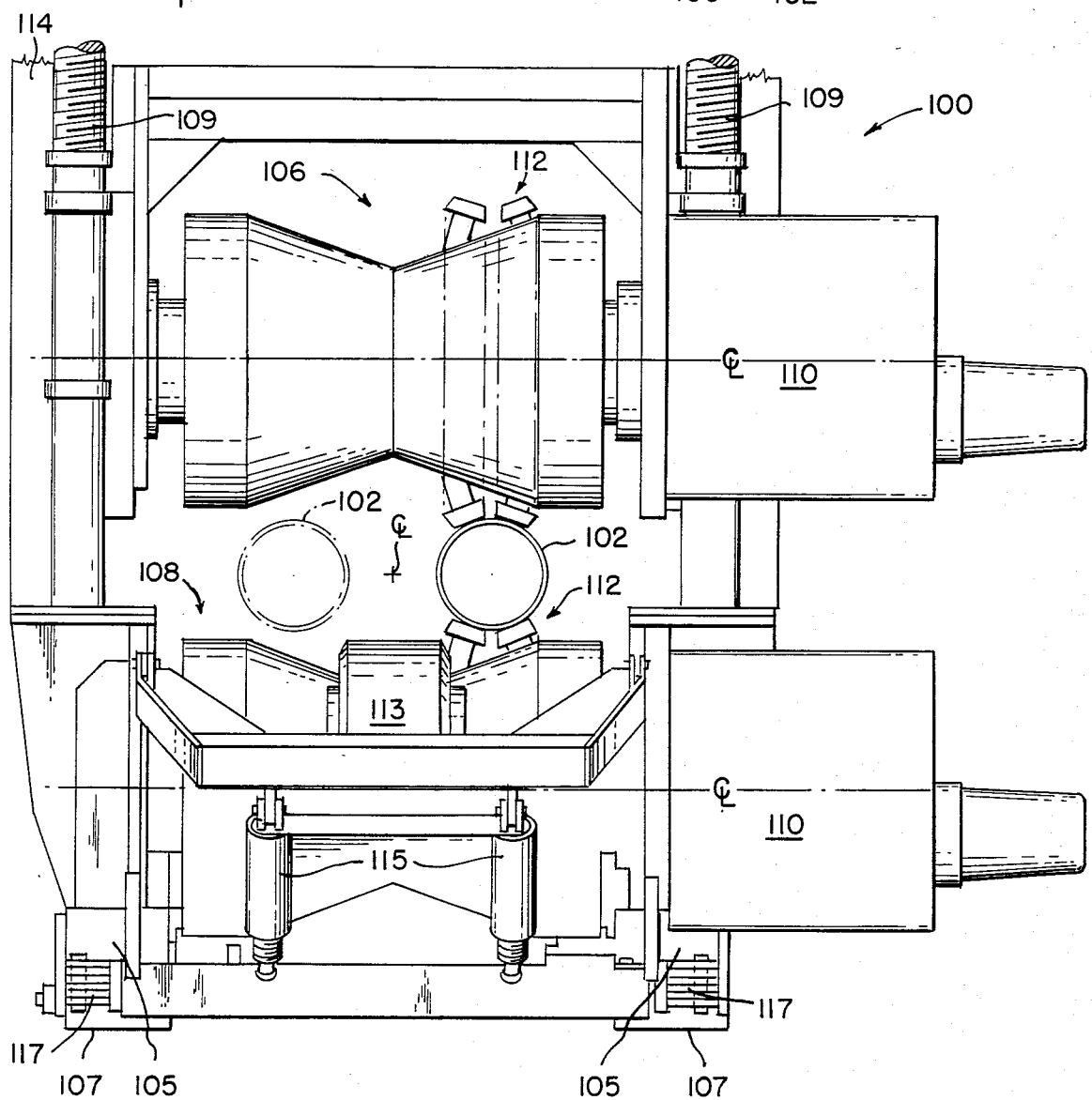
FIG. 3 is a partially schematic, front elevational detail of a forward pipe tensioner according to the present invention.
Figure 4:
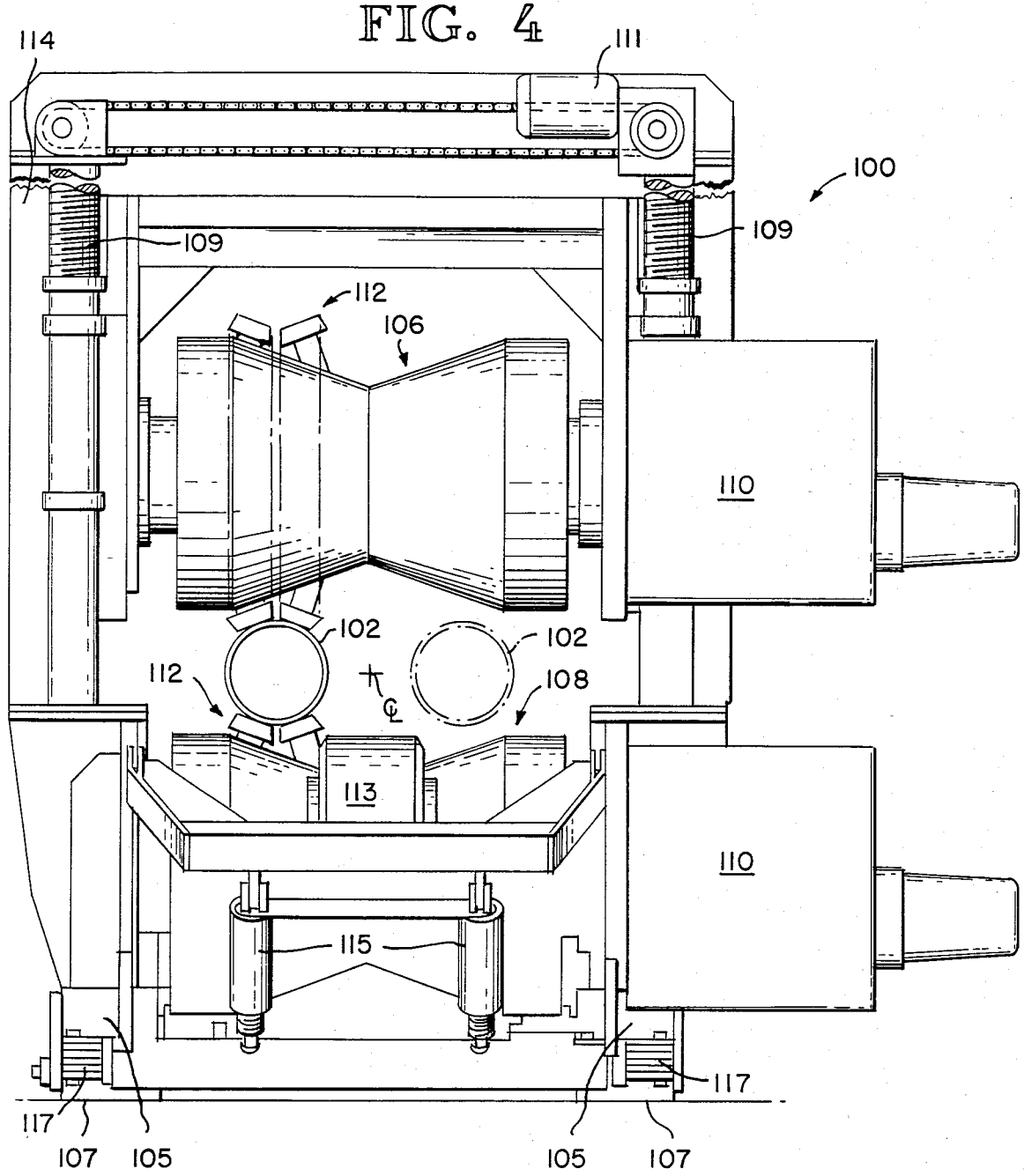
FIG. 4 is a partially schematic, front elevational detail, similar to FIG. 3, showing an aft pipe tensioner according to the present invention.

As described in U.S. Pat. No. 3,669,329 (incorporated by reference), a pipe tensioner (FIG. 3) includes as upper drive unit 106 and a lower drive unit 108. The upper drive unit 106 preferably is vertically adjustable with respect to the lower drive unit 108 through worm gears 109 turned simultaneously by a motor 111 which is mounted atop the tensioner housing 114 (FIG. 4). Both drive units 106, 108 are housed on a vertically extending frame so that the drive units and the entire structural frame of the housing 114 are supported by the lowermost horizontally disposed frame member of the pipe tensioner. The frame may also include a support roller 113 hinged to the frame and supported by jackscrews 115, as shown in FIGS. 3 and 4. This roller 113 engages a large single pipe during laying of the pipe.

The lowermost horizontal frame member 105 of the housing 114 is connected to a deck support 107 on the surface of the pipe-laying barge through a strap or a flexible pad 117 so that the entire housing 114 can move along the longitudinal axis of the lowermost frame member 105. This direction of movement coincides with the direction of pipe travel during the laying operation.

Each drive unit 106, 108 includes a variable-speed hydraulic motor 110 which controls the rate of speed of the caterpillar-type track unit 112 which is used to tension the pipe within the pipe tensioner 100 and to propel the pipe 102 at a desired velocity as the pipe 102 passes through the tensioner 100. To accommodate pipes of varying diameters, the upper drive unit 106 is vertically adjustable relative to the lower drive unit 108 (as previously described).

In all important structural respects, the preferred pipe tensioners 100 of the pipe invention are identical to those described in U.S. Pat. No. 3,669,329. Flexible pads 117 may be used instead of the straps which the earlier patent discusses. Because of the similarity, discussion will focus on the modifications made to the pipe tensioners 100 to allow accommodation of a plurality of pipes for their simultaneous laying.

Figure 5:
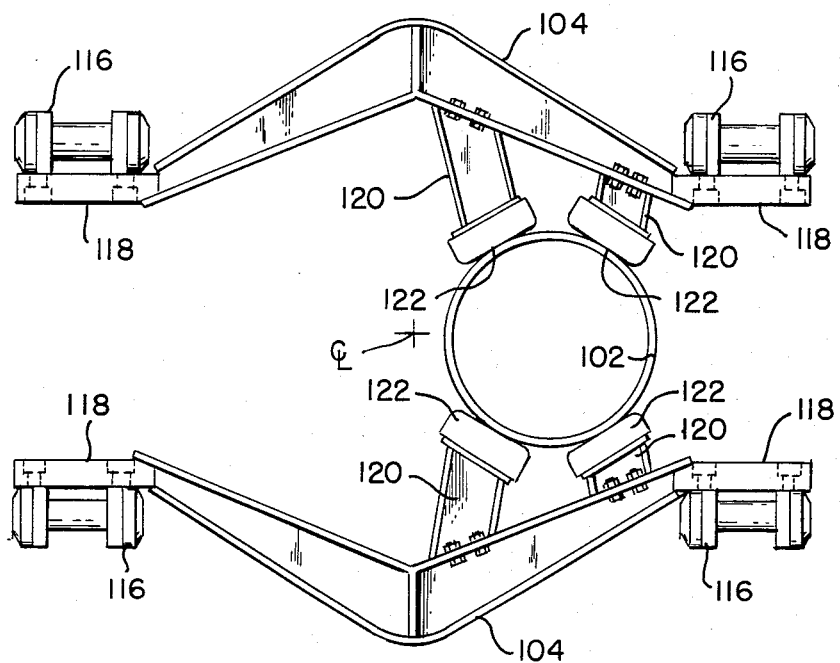
FIG. 5 is a detailed isolational view of a preferred single bridging V-member of a pipe tensioner according to the present invention.
Figure 6:
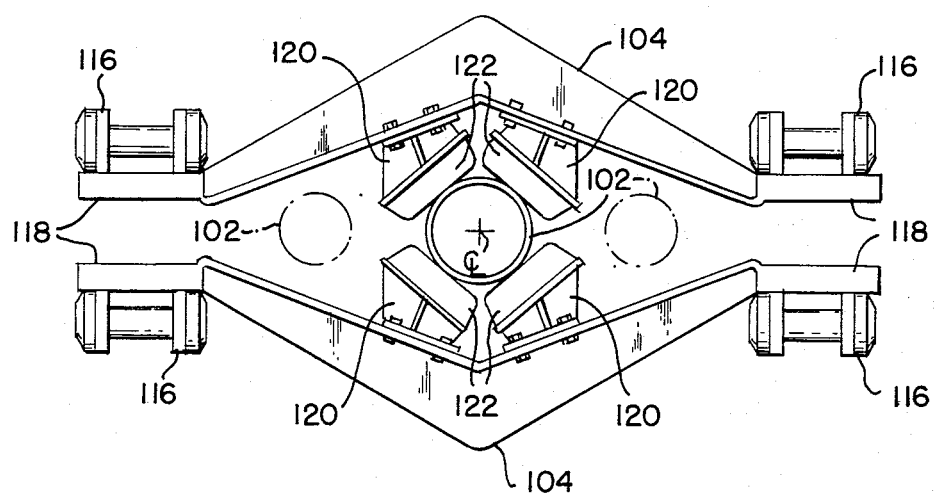
FIG. 6 is a detailed isolational view in side elevation, similar to FIG. 5, showing a configuration in which three pipes may be simultaneously tensioned and laid by the barge.

FIGS. 5 and 6 show detailed elevational views of individual, bridging V-members 104, which are interconnected with other V-members 104 as disclosed in FIG. 7 of U.S. Pat. No. 3,669,329 to form spaced caterpillar-type track units 112 (FIGS. 3 and 4). Chain link members 116 are bolted to outwardly extending flanges 118 on opposite sides of the bridging V-members 104 so that the V-members 104 may be interconnected into an endless belt chain which engages sprockets of the drive units 106 and 108 and are turned by the motors 110 previously described. The V-members 104 have a plurality of evenly spaced holes along their entire length to accommodate brackets 120 (pipe holders) which are bolted to the V-members 104 to define a cradle for a pipe 102. Each bracket 120 terminates in a rubber pad (shoe) 122 which frictionally engages the pipe 102 to tension the pipe.

The brackets 120 are especially designed to cradle a relatively small diameter pipe 102 which is to be tensioned by the tensioner 100. When properly positioned on the V-members 104 askew from the centerline of the tensioner 100, as shown in FIGS. 3 and 4, it is possible to tension a first pipe 102 in one pipe tensioner 100 while allowing a second pipe to pass through the pipe tensioner 100 without contacting or engaging the upper or lower drive units 106 and 108, so that the second pipe is unaffected by the pipe tensioner 100. In this manner, it is possible to lay two or more pipes simultaneously in horizontal, parallel array. As illustrated in FIG. 6, if the pipes 102 are small enough, it is possible to lay three of more pipes. This multiplpe method, however, requires that a similar number of pipe tensioners 100 be coaxially aligned upon the deck of the pipe laying barge. Since it is customary to have two or three coaxially aligned pipe tensioners 100 on a pipe-laying barge for tensioning a large pipe, the method and apparatus of the present invention will advantageously be used to lay two or three pipes simultaneously.

The pipe tensioner of U.S. Pat. No. 3,669,329 includes a control system for applying the correct tension to the pipe which is being laid. Alternatively, the control system may be of the type described in U.S. Pat. No. 3,722,769 (incorporated by reference). Other suitable conventional controls, however, may be used so that one pipe is tensioned in each tensioner 100. Two complete sets of controls and hydraulic circuits may be used. Alternatively, a unified control system and hydraulic circuit could be installed so that control of the pipe tensioners could occur from a single control unit rather than separately at each tensioner.

The air bags used with the caterpillar-type tracks of the type shown in U.S. Pat. No. 3,669,329 are separately actuated in the present invention to allow the port and starboard squeeze pressures of each track to be set differently. To achieve this function, the tensioners must be modified, but those skilled in the art readily will be able to make these modifications to a conventional pipe tensioner.

A preferred embodiment has been shown and described. The invention should be limited to this embodiment only if such limitation is necessary in view of the claims interpreted in light of the relevant prior art.

We claim:

1. A method for simultaneously tensioning at least two relatively small diameter pipes during a pipe-laying operation on a barge having axially aligned pipe tensioners which are capable of simultaneously tensioning the same relatively large diameter pipe in a conventional pipe-laying operation, comprising the steps of:
   (a) tensioning a first pipe with a first pipe tensioner while freely passing a second pipe through the first pipe tensioner so that the first pipe tensioner does not apply a tensioning force to engage the second pipe; and
   (b) tensioning the second pipe with a second pipe tensioner, axially aligned behind the first pipe tensioner, while freely passing the first pipe through the second pipe tensioner so that the second pipe tensioner does not apply a tensioning force to the first pipe.

2. The method of claim 1 wherein the first pipe passes through the second pipe tensioner without engaging the second pipe tensioner, and the second pipe passes through the first pipe tensioner without engaging the first pipe tensioner.

3. The method of claim 1, further comprising the steps of:
   (a) tensioning a third pipe in a third pipe tensioner axially aligned with the first and second tensioners while passing the third pipe through the first and second pipe tensioners untensioned; and
   (b) passing the first and second pipes through the third pipe tensioner untensioned.

4. The method of claim 1 wherein the pipes are disposed in substantially parallel array in a substantially horizontal plane.

5. An apparatus for tensioning pipes on a pipe-laying barge, the apparatus being adapted for use in a method of laying a plurality of pipes simultaneously, comprising:
   (a) a pair of vertically stacked, caterpillar-type tracks, each track including a motor capable of driving the track independently at a variable speed to maintain a predetermined tension upon a pipe;
   (b) a housing for the tracks to which the tracks are mounted;
   (c) means for adjusting the relative vertical position of the tracks within the housing so that the tracks are capable of receiving pipes of different diameters;
   (d) means for suspending the housing from a relatively fixed support so that the housing is capable of movement along the direction that pipes are fed from the apparatus;
   (e) means, responsive to the movement of the housing, for adjusting the rate of feed of the pipes from the apparatus and for returning the housing to a neutral position so that a constant tension may be maintained on a pipe which is tensioned in the apparatus; and
   (f) pipe holders mounted on the tracks to cradle the pipe which is tensioned in the apparatus, to apply the desired tension to the pipe, and to allow at least one other pipe to pass freely through the housing adjacent to the tensioned pipe.

6. The apparatus of claim 5 wherein the pipe holders include elastomeric pads for frictionally engaging the pipe to tension the pipe while leaving the external surface of the pipe substantially unmarred when the pipe is tensioned.

7. The apparatus of claim 5 wherein the tensioned pipe is laterally offset from the centerline of the pipe tensioner.

8. An apparatus for tensioning pipes on a pipe-laying barge, the apparatus being adapted for laying at least two pipes simultaneously, comprising:
   (a) a plurality of axially aligned pipe tensioners; and
   (b) means, on each pipe tensioner, for cradling a pipe so that the cradled pipe can be tensioned in the pipe tensioner, and for allowing at least one other pipe to pass freely through each pipe tensioner so that the barge can lay at least two pipes simultaneously, wherein the pipe tensioned in one pipe tensioner passes freely through the other pipe tensioners.

9. The apparatus of claim 8 wherein the pipes are aligned in substantially parallel array in a substantially horizontal plane.

10. The apparatus of claim 8 wherein the pipe tensioners include a plurality of spaced, caterpillar-type tracks to which the means for cradling are attached.

11. The apparatus of claim 8, further comprising means for maintaining the tension applied to a pipe in each pipe tensioner substantially at a predetermined value.

12. An apparatus for tensioning pipes on a pipe-laying barge, the apparatus being adapted for laying at least two pipes simultaneously side-by-side, comprising:
   (a) a first and second pipe tensioner;
   (b) means, on each pipe tensioner, for applying a substantially constant, predetermined tension to a pipe while allowing at least one other pipe to freely pass through the pipe tensioner, wherein the pipe tensioned in the first pipe tensioner passes freely through the second pipe tensioner, while the pipe tensioned in the second pipe tensioner passes freely through the first pipe tensioner.

13. The apparatus of claim 12 wherein each pipe tensioner includes a plurality of spaced, caterpillar-type tracks operatively associated with the means for applying a substantially constant, predetermined tension, and a plurality of motors, at least one motor associated with each track and adapted to drive the associated track independently of the other tracks at adjustable speeds to maintain the desired tension in the pipe.

14. The apparatus of claim 12 wherein the tensioning means on each pipe tensioner includes at least one elastomeric pad for frictionally engaging the pipe to tension the pipe while leaving the external surface of the pipe substantially unmarred when the pipe is tensioned.

15. The apparatus of claim 14 wherein each pad is mounted to a bridging V-member, the tensioning means comprising a plurality of V-members interconnected to form an endless belt.

16. A method for converting a pipe-laying bardge from a conventional pipe-laying operation to a multiple pipe-laying operation wherein at least two axially aligned pipe tensioners are used to independently tension a different, single pipe in a separate pipe tensioner during simultaneous tensioning of several pipes, comprising the steps of:
   (a) removing the conventional pipe gripping pads from the bridging V-members of at least two axially-aligned, conventional caterpillar-type pipe tensioners, wherein the pipe tensioners define a common pipe moving axis; and
   (b) positioning other pipe gripping pads on the V-members of each tensioner so that one pipe can be tensioned in the first pipe tensioner, but not in the second pipe tensioner, while a second pipe can be tensioned simultaneously in the second pipe tensioner, but not in the first pipe tensioner.

17. The method of claim 16 wherein the position of the other pads on the respective tensioners define two substantially parallel axes for movement of the pipes, at least one of the axes being displaced from the common pipe moving axis so that the multiple pipes extend in substantially parallel array through the pipe tensioners during the pipe-laying operation.

18. The method of claim 17 wherein the conventional pads are removed from about the common pipe moving axis and wherein the other pads are positioned on respective pipe tensioners, the other pads on each pipe tensioner surrounding an axis for movement of the pipes simultaneously through the tensioners.

19. The method of claim 18 wherein the other pads positioned on the first pipe tensioner are mounted on one side of the common pipe moving axis while the other pads positioned on the second pipe tensioner are mounted on the other side of the common pipe moving axis.

20. The method of claim 19 wherein the other pads are of two different types to account for the slope of the V-member on which the pads are mounted.

* * * * *